United States Patent [19]
Attarwala

[11] Patent Number: 6,093,780
[45] Date of Patent: Jul. 25, 2000

[54] CYANOACRYLATE ADHESIVE COMPOSITIONS WITH IMPROVED CURED THERMAL PROPERTIES

[75] Inventor: Shabbir Attarwala, West Hartford, Conn.

[73] Assignee: Loctite Corporation, Rocky Hill, Conn.

[21] Appl. No.: 09/165,196

[22] Filed: Oct. 2, 1998

[51] Int. Cl.⁷ ...................................................... C08K 5/32
[52] U.S. Cl. .......................... 526/298; 526/193; 526/194; 526/201; 526/220; 526/297
[58] Field of Search .................................... 526/298, 297, 526/194, 193

[56] References Cited

U.S. PATENT DOCUMENTS

| | | |
|---|---|---|
| 3,832,334 | 8/1974 | O'Sullivan . |
| 4,196,271 | 4/1980 | Yamada .................................. 525/242 |
| 4,440,910 | 4/1984 | O'Connor ............................... 525/295 |
| 4,450,265 | 5/1984 | Harris ..................................... 526/298 |
| 4,459,373 | 7/1984 | Hahn ....................................... 521/56 |
| 4,477,607 | 10/1984 | Litke ...................................... 523/212 |
| 4,490,515 | 12/1984 | Mariotti ................................. 526/298 |
| 4,532,293 | 7/1985 | Ikeda ...................................... 524/754 |
| 4,533,422 | 8/1985 | Litke ..................................... 156/307.3 |
| 5,140,084 | 8/1992 | Mikuni .................................... 526/279 |
| 5,288,794 | 2/1994 | Attarwala ............................... 524/714 |
| 5,328,944 | 7/1994 | Attarwala ................................. 524/83 |
| 5,424,343 | 6/1995 | Attarwala ................................. 524/83 |

FOREIGN PATENT DOCUMENTS

| | | |
|---|---|---|
| 48-8732 | 3/1973 | Japan . |
| 55-66980 | 5/1980 | Japan . |
| 514010 | 4/1973 | U.S.S.R. . |
| 1017612 | 1/1966 | United Kingdom . |

OTHER PUBLICATIONS

H.V. Coover, D.W. Dreifus & J.T. O'Connor, "Cyanoacrylate Adhesives" in *Handbook of Adhesives*, 27, 463–77, I. Skeist, ed., Van Nostrand Reinhold, N.Y., 3d ed. (1990).

G.H. Millet, "Cyanoacrylate Adhesives" in *Structural Adhesives: Chemistry & Technology*, 249–303, S. R. Hartshorn, ed., Plenum Press, N.Y. (1986).

*Primary Examiner*—Fred Zitomer
*Attorney, Agent, or Firm*—Steven C. Bauman

[57] ABSTRACT

The present invention is directed to cyanoacrylate-based compositions, which include in addition to the cyanoacrylate component, a thermal-resistance conferring agent, such as an alkylating agent and/or silylating agent, which provides reaction products of the compositions with improved thermal resistance properties.

18 Claims, No Drawings

CYANOACRYLATE ADHESIVE COMPOSITIONS WITH IMPROVED CURED THERMAL PROPERTIES

BACKGROUND OF THE INVENTION

1. Field of the Invention

The present invention is directed to cyanoacrylate-based compositions, which include, in addition to the cyanoacrylate component, a thermal-resistance conferring agent, such as an alkylating agent and/or silylating agent, which provides reaction products of the compositions with improved thermal resistance properties.

2. Brief Description of Related Technology

Cyanoacrylates generally are quick-setting materials which cure to clear, hard glassy resins, useful as sealants, coatings, and particularly adhesives for bonding together a variety of substrates [see e.g., H. V. Coover, D. W. Dreifus and J. T. O'Connor, "Cyanoacrylate Adhesives" in *Handbook of Adhesives*, 27, 463–77, I. Skeist, ed., Van Nostrand Reinhold, New York, 3rd ed. (1990)].

A well-known problem of polymerized cyanoacrylates is their susceptibility to thermal degradation under elevated temperature conditions. [see e.g., G. H. Millet, "Cyanoacrylate Adhesives" in *Structure Adhesives: Chemistry and Technology*, 249–303, 279–80, S. R. Hartshorn, ed., Plenum Press, New York (1986)]. Due at least in part to this inherent limitation of the cured cyanoacrylate, the instant adhesive benefits of cyanoacrylate monomers have not been available in many applications where the bonded substrates may be exposed to temperatures exceeding 120° C. on an intermittent basis, or extended exposure to temperatures of about 80° C.

While this problem is distinct from stabilizing cyanoacrylate monomer formulations against premature polymerization, to preserve the instant adhesive benefits of cyanoacrylates strides toward improved polymerized cyanoacrylate thermal stability should not significantly degrade the storage stability or cure speed of cyanoacrylate monomer formulations from which the polymer is derived.

Efforts have been and continue to be made to improve the thermal stability of cyanoacrylate adhesive bonds.

For instance, in U.S. Pat. No. 3,832,334, the addition of maleic anhydride is said to produce adhesives which have increased thermal resistance while preserving fast cure speed of the cyanoacrylate adhesive.

In U.S. Pat. No. 4,196,271, tri-, tetra- and higher carboxylic acids of these anhydrides are said to be useful for improving heat resistance of cured cyanoacrylate adhesives.

U.S. Pat. No. 4,450,265 is directed to the use of phthalic anhydride to improve heat resistance of cyanoacrylate adhesive bonds.

U.S. Pat. No. 4,532,293 refers to benzophenonetetracarboxylic acid (or its anhydride) to provide a superior heat resistance for cyanoacrylate adhesives.

According to Chem. Abst. 85:64138p, a cyanoacrylate adhesive which includes a graft copolymer of methyl methacrylate and a fluorine containing rubber as a plasticizer is reported to give improved stability to thermal shocks.

In U.S. Pat. No. 4,490,515, cyanoacrylate compounds containing certain maleimide or nadimide compounds are reported to improve the hot strength properties of cyanoacrylate adhesives.

In Japanese Patent Document JP 55/66980, mixtures of certain sulfone compounds and a dicarboxylic acid or dicarboxylic anhydride are reported, which are said to improve heat resistance of cyanoacrylate adhesives.

In Japanese Patent Document JP 48/8732, cyanoacrylates containing 3–25% divinyl sulfone are reported to have improved heat resistance.

In U.S. Pat. No. 5,306,752 (Attarwala), U.S. Pat. No. 5,328,944 (Attarwala), U.S. Pat. No. 5,288,794 (Attarwala), and U.S. Pat. No. 5,424,343 (Attarwala), a cyanoacrylate-containing composition is provided which is stabilized against thermal degradation by the addition of certain quinoid compounds, certain sulfur compounds, certain mono, poly and/or hetero aromatic compounds, and napthasultone compounds, respectively.

And U.S. Pat. No. 4,440,910 (O'Connor) refers to cyanoacrylate compositions, which include certain elastomeric acrylic rubbers to give improved properties, particularly after exposure to elevated temperatures.

Notwithstanding the state-of-the-art, there continues to be a need to identify materials which will improve the heat performance of cyanoacrylate adhesives so as to increase the options available to accomplish this goal, particularly depending on the desires in the marketplace, and/or provide further improvements over the existing additives known to enhance cyanoacrylate thermal resistance.

SUMMARY OF THE INVENTION

The present invention is directed to cyanoacrylate-based compositions, which include in addition to the cyanoacrylate component, a thermal resistance-conferring agent, such as an alkylating agent and/or silylating agent, which provides reaction products of the compositions with improved thermal resistance properties.

That is, reaction products of the composition of this invention show improved thermal properties due to the inclusion of the thermal resistance-conferring agents, such as an alkylating agent and/or silylating agent.

The alkylating agents may be chosen form a host of materials, such as benzyl halides and derivatives thereof, halo ketones, halo esters, halo ethers, and $\alpha$, $\beta$- and $\gamma$, $\delta$-unsaturated ketones, esters, nitriles, nitro compounds, and sulfates. More specifically, examples are set forth below.

The silylating agents may also be chosen from a host of materials including trialkylsilyl alkylsulfonates, trialkylsilyl arylsulfonates, trialkylsilyl alkyltrihalo sulfonates, bis trialkylsilyl sulfates, tris alkylsilyl alkyltrihalo sulfonates, trialkylsilyl phosphates, and tris trialkylsilyl phosphates. More specific examples are also set forth below.

Of course, combinations of the alkylating agents and/or the silylating agents may be used to confer the thermal resistance properties to the compositions of this invention.

This invention also provides methods for preparing and using such compositions, as will be set forth in more detail hereinafter.

The invention will be more fully appreciated by a reading of the section entitled "Detailed Description of the Invention" which follows.

DETAILED DESCRIPTION OF THE INVENTION

The $\alpha$-cyanoacrylate adhesive compositions of this invention include an $\alpha$-cyanoacrylate component. Typically, within such component are at least one cyanoacrylate monomer of the formula:

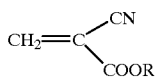

where R represents a $C_{1-16}$ alkyl, cycloalkyl, alkenyl, alkynyl, cycloalkenyl, alkaryl, aralkyl or aryl group, any of which may be optionally substituted, or interrupted, with non-basic groups, such as oxo, halo silicone and ether oxygen, provided they do not interfere with the stability and functioning of the monomer as a commercially acceptable adhesive.

For instance, R may be selected from a methyl, ethyl, n-propyl, isopropyl, n-butyl, isobutyl, pentyl, neo-pentyl, hexyl, allyl, methallyl, crotyl, propargyl, cyclohexyl, benzyl, phenyl, cresyl, 2-chlorobutyl, trifluoroethyl, 2-methoxyethyl, 3-methoxybutyl and 2-ethoxyethyl. Ethyl cyanoacrylate is a particularly desirable monomer for use in the inventive compositions.

Of course, as stated above, a mixture of two or more of these α-cyanoacrylate monomers can be used.

The composition of this invention show improved thermal properties due to the inclusion of the thermal-resistance conferring agent, such as the alkylating agent and/or silylating agent.

As noted above, the alkylating agents may be chosen form a host of materials, such as those recited generally above. More specifically, polyvinyl benzylchloride, 4-nitro benzylchloride, n-butyl-p-toluenesulfonate ester, acetone disulfonic acid diethyl ester, dibutyl sulfate, ethynyl-p-tolyl sulfone, ethyl trifouoromethane sulfonate, ethyl methane sulfonate, and methyl-p-toluene sulfonate are well-suited for use herein.

The silylating agents may also be chosen from a host of materials, such as those recited above. More specifically, trimethylsilyl methanesulfonate, trimethylsilyl benzene sulfonate, trimethylsilyl methanetrifluoro sulfonate, bis trimethylsilyl sulfate, tris isopropylsilyl methanetrifluoro sulfonate, triethylsilyl phosphate, tris trimethylsilyl phosphate, and di-tertbutylsilyl bis [trifluoro methane sulfonate] are well-suited for use herein.

Of course, combinations of the alkylating agents and/or the silylating agents may be used to confer the thermal resistance properties to the compositions of this invention.

The alkylating agent and/or silkylating agent should be used in an amount within the range of from about 0.1 to about 10% by weight, based on the total weight of the adhesive composition, to achieve the desired affect.

Ordinarily, the α-cyanoacrylate component of the present invention is present in an amount within the range of from about 75 to about 99% by weight, based on the total weight of the adhesive composition.

Additional components, such as those set forth below, may be included in a cyanoacrylate-containing compositions destined for use as an adhesive:

(1) An anionic polymerization inhibitor;
(2) A radical polymerization inhibitor;
(3) A thixotropy agent or thickening agent;
(4) Special additives such as cure accelerators, plasticizers, tougheners and heat stabilizers; and
(5) Perfumes, dyes, pigments, and the like.

As noted above, an anionic polymerization inhibitor may be added to the cyanoacrylate adhesive composition, such as in an amount within the range of from about 1 to about 1000 ppm, based on the total weight of the adhesive composition. The anionic polymerization inhibitor tends to increase the stability of the adhesive composition during storage. Examples of such inhibitors include sulfur dioxide, sulfur trioxide, nitric oxide, hydrogen fluoride, certain sultones, methane sulfonic acid ("MSA"), hydroxypropane sulfonic acid ("HPSA"), and combinations thereof.

Desirably, the anionic polymerization inhibitor should be included in the composition within the range of from about 5 to about 100 ppm, such as about 10 to 50 ppm, based on cyanoacrylate monomer weight.

The cyanoacrylate adhesive compositions of this invention may also contain an inhibitor of free radical polymerization. Included among such free radical inhibitors include those of the phenolic type, such as quinone, hydroquinone, t-butyl catechol, p-methoxyphenol, butylated-hydroxy anisole and the like.

Desirably, the free radical inhibitor should be included in the composition within the range of from about 5 to about 100 ppm, such as about 10 to 50 ppm, based on the weight of cyanoacryate monomer.

A thixotropy agent or thickener agent may be added to the composition to increase the viscosity of the α-cyanoacrylate adhesive composition. α-Cyanoacrylate monomers generally have a low viscosity of about several centipoises, and therefore, the adhesive penetrates into porous materials, such as wood and leather or adherents having a rough surface. As a result, good adhesion strengths are often difficult to obtain. Various polymers can be used as thickeners and examples include poly(methyl) methacrylate, methacrylate-type copolymers, acrylic rubbers, cellulose derivatives, polyvinyl acetate and poly-cyanoacrylate). In addition, certain inorganic fillers may be added to the composition to center the thioxotropic effect. Desirably among such fillers are treated silicas, such as those disclosed in U.S. Pat. No. 4,477,607 (Litke) and U.S. Pat. No. 4,533,422 (Litke). A suitable amount of thixotropy agent or thickener agent is generally about 20% by weight or less, based on the total weight of the adhesive composition.

A number of conventional polymer additives may also be added for toughening purposes. Examples include acrylic elastomers, acrylonitrile copolymer elastomers and fluoro elastomers. In appropriate amounts, such materials may serve as both thickener and toughener.

Examples of cure accelerator calixarene compounds include those described in U.S. Pat. Nos. 4,556,700 and 4,695,615, and silacrown compounds include those described in U.S. Pat. No. 4,906,317. Other accelerators may also be used, and are well known to those skilled in the art.

Other common additives for cyanoacrylate adhesive compositions are plasticizers. Plasticizers serve to make the cured bonds less brittle and, therefore, more durable. Common among these plasticizers are $C_{1-10}$ alkyl esters of dibasic acids such as sebasic acid and malonic acid. Other plasticizers, such as diaryl ethers and polyurethanes, also may be used, and a variety of such other plasticizers are also known. See also G. H. Millet, "Cyanoacrylate Adhesives" in *Structural Adhesives: Chemistry and Technology*.

The plasticizers, as well as cyanoacrylate-compatible perfumes, dyes, pigments, and the like, may be added depending on the desired end uses to which the composition is to be placed. The amounts chosen should not adversely affect the stability of the α-cyanoacrylate monomer.

The invention also provides a method of preparing a cyanoacrylate-containing composition, the step of which includes combining an α-cyanoacrylate component with an amount of a thermal resistance-conferring agent effective to confer enhanced thermal resistance to reaction products of the composition.

In addition, the invention provides a method of using such a composition to bond together two substrates, the steps of which include applying the composition to a surface of one of the substrates and mating the other substrate therewith.

The invention will be more fully understood from a reading of the Examples section, which follows.

EXAMPLES

Eleven ethyl-cyanoacrylate-containing samples were prepared which included an alkylating agent, and six samples were prepared which included a silylating agent. These samples are numbered 1–10 and 11–16, respectively. One ethyl cyanoacrylate-containing sample (Sample No. 17) was prepared with triethyl phosphate to demonstrate the difference that the silyl group makes to the additive. Another ethyl cyanoacrylate-containing sample (Sample No. 18) contained no additive, and was used as a control.

Table 1 sets forth examples of the alkylating agents ("AA") used as the thermal resistance-conferring agent, with the amount by weight used. In addition, Table 1 sets forth thermal decomposition data (in terms of onset of decomposition and percent weight loss at a temperature of about 150° C.), accelerated shelf-life stability data, and fixture speeds.

TABLE 1

| | | | Properties | | | |
|---|---|---|---|---|---|---|
| | AA | | Onset of | % wt Loss @ | 82° C. | Fixture Speed (secs) |
| Sample No. | Type | Amt. (wt %) | Decomp. (° C.) | 150° C. (900 mins.) | Stability (days) | Balsa Wood | Cow Leather |
| 1 | PVBC | 10 | 189 | 30 | 20 | 21 | 36 |
| 2 | NBC | 10 | 185 | 40 | 20 | 20 | 36 |
| 3 | ETFMS | 0.1 | 195 | 15 | 20 | 70 | 300 |
| 4 | EMS | 1.0 | 195 | 15 | 20 | 70 | 300 |
| 5 | MpTS | 5.0 | 195 | 18 | 20 | 20 | 36 |
| 6 | BpTSE | 5.0 | 190 | 30 | 20 | 21 | 35 |
| 7 | ADSDME | 1.5 | 195 | 20 | 20 | 20 | 35 |
| 8 | DBS | 1.5 | 195 | 20 | 20 | 20 | 35 |
| 9 | AURIN | 0.5 | 183 | 54 | 20 | 22 | 37 |
| 10 | EpTS | 2.0 | 190 | 32 | 20 | 21 | 36 |

The chemical name for the abbreviated alkylating agents are set forth below.
PVBC—Polyvinyl Benzylchloride
NBC—4-Nitro Benzylchloride
BpTSE—n-Buyl-p-Toluenesulfonate Ester
ADSDE—Acetone Disulfonic Acid Diethyl Ester
DBS—Dibutyl Sulfate
EpTS—Ethyny-p-Tolyl Sulfone
ETFMS—Ethyl Trifluoromethane Sulfonate
EMS—Ethyl Methane Sulfonate
MpTS—Methyl-p-Toluene Sulfonate Table 2 sets forth examples of silylating agents ("SA") used as the thermal resistance-conferring agent at a 10% by weight level. In addition, Table 2 sets forth thermal composition data.

TABLE 2

| | | TGA Analysis | |
|---|---|---|---|
| Sample No. | SA @ 10 wt % | Onset Of Decomp. (° C.) | wt % Loss @ 150° C. (900 Mins.) |
| 11 | Trimethylsilyl Methanesulfonae | 212 | — |
| 12 | Trimethylsilyl Benzensulfonate | 225 | 10 |
| 13 | Trimethylsilyl Mehtanethrifluoro Sulfonate | 206 | — |
| 14 | Bis Trimethysilyl Sulfate | 222 | 7.7 |
| 15 | Tris Isopropylsilyl Methanetrifluoro Sulfonate | 211 | — |
| 16 | Tris Trimethylsilyl Phosphate | 227 | 4.2 |

Table 3 sets forth Sample Nos. 17 and 18, which are triethyl phosphate-containing ethyl cyanoacrylate and ethyl cyanoacrylate without any of such thermal resistance-conferring agent, respectively. These samples are shown for comparative purposes.

TABLE 3

| | | TGA Analysis | |
|---|---|---|---|
| Sample No. | Additives 10 wt % | On Set Of Decomposition | wt % Loss @ 150° C. (900 Mins.) |
| 17 | Triethyl Phosphate | 176 | 90 |
| 18 | — | 155 | 98 |

As may be seen from the tables, the control (Sample No. 18) has an onset of decomposition temperature of about 155° C., whereas the samples containing an alkylating agent generally have such onset of decomposition temperatures beginning at at least about 183° C., and the samples containing a silylating agent generally have such onset of decomposition temperatures of about beginning at at least about 206° C.

In addition, the percent weight loss of the control at a temperature of about 150° C. over a period of time of about 900 minutes is about 98%. In contrast, with the addition of an alkylating agent, the percent weight loss is recorded to be as low as about 15% and at most about 54%. And, with the addition of a silylating agent, it is seen that percent weight loss is as low as about 7.7%.

Sample No. 17 shows that the addition of a phosphate-containing component without a silyl group reduces the percent weight loss over the cyanoacrylate control by only about 8%.

The alkylating agents used in the present invention do not adversely impact shelf-life stability or fixture times, as shown in Table 1.

The effects of various alkylating agents and/or silylating agents on the thermal properties of cured cyanoacrylate polymers were investigated in several ways. Thermal analyses of cyanoacrylate polymers to which had been added amounts of additive as shown in Table 1 were conducted dynamically to determine temperatures at which decomposition onset occurred and isothermally at a temperature of about 150° C. to determine relative weight loss of polymer on heat aging. Fixture speeds and 82° C. stability were performed on monomer formulations containing the thermal resistance-conferring agents to ascertain whether the agent affected the cure speed or storage stability of the formulation, the results of which are presented in Table 1. As may be seen the fixture speeds at a temperature of about 82° C. stability are represented at substantially unaffected by the addition of such agents.

Thermal analysis was performed using two different instruments: the DuPont 2100 Thermal System with a 951 Thermogravimetric Analyzer attached, and the Seiko SSC5245HM2 controller attached to TG/DTA220 Thermogravimetric Differential Thermal Analyzer. Isothermal runs were started from a temperature of about 30° C. and heated at 50° C./min up to 150° C. and held at that temperature for 900 minutes under 250 cc/min nitrogen gas flow. Temperature dynamic runs were started at 30° C. and heated at 10° C./min up to 450° C. under 250 cc/min nitrogen gas flow.

Samples for dynamic thermal analyses were all prepared by intimate mixing with a mortar and pestle of a prepolymerized cyanoacrylate polymer and the additive followed by heating of the mixture at a temperature of about 100° C. for a period of time of about two hours. Samples for isothermal analyses were either prepared in the same way or from a film prepared by placing a droplet of a monomer formulation containing the additive between pressed SANTOPRENE blocks for a period of time of about 72 hours at room temperature followed by post curing at a temperature of about 100° C. for a period of time of about 2 hours, and then separating the resulting polymer film. Both methods of sample preparation were found to give equivalent results.

Freshly-distilled ethyl cyanoacrylate monomer containing methane sulfonic acid (10 ppm), sulfur dioxide (2 ppm) and hydroquinone (3000 ppm) was used in preparing the samples for thermogravimetry analysis.

Fixture speeds were measured on formulations containing a polymethyl methacrylate (6 wt %), hydrophobic silica (6 wt %), calixarene (0.5 wt %) and silacrown (0.5 wt %) in ethyl cyanoacrylate monomer.

The true spirit and scope of the invention is measured by the claims.

What is claimed is:

1. A cyanoacrylate-containing composition, reaction products of which demonstrate enhanced thermal resistance properties, comprising:
    (a) an α-cyanoacrylate component, and
    (b) a thermal resistance-conferring component selected from the group consisting of alkylating agents selected from the group consisting of polyvinyl benzyl chloride, 4-nitrobenzyl chloride, and combinations thereof, silylating agents, and combinations thereof.

2. The composition according to claim 1, wherein the thermal resistance-conferring agent is present in an amount effective to confer enhanced thermal resistance to reaction products of the composition.

3. The composition according to claim 2, wherein the thermal resistance-conferring agent is present in an amount within the range of from about 0.1 to about 10%, by weight of the composition.

4. The composition according to claim 1, wherein the thermal resistance-conferring agent is present in an amount of at least about 0.5%, by weight of the composition.

5. The composition according to claim 1, wherein the thermal resistance-conferring agent is present in an amount within the range of from about 0.5%–75%, by weight of the composition.

6. The composition according to claim 1, wherein said thermal resistance-conferring agent is an alkylating agent.

7. The composition according to claim 6, wherein said alkylating agent is polyvinyl benzyl chloride.

8. The composition according to claim 6, wherein said alkylating agent is ethyl methane sufonate.

9. The composition according to claim 6, wherein said alkylating agent is ethynyl trifluoromethane sufonate.

10. The composition according to claim 6, having an onset of decomposition temperature of at least about 180° C.

11. The composition according to claim 1, wherein said thermal resistance-conferring agent is a silylating agent.

12. The composition according to claim 5, wherein said silylating agent is selected from the group consisting of trimethylsilyl methanesulfonate, trimethylsilyl benzene sulfonate, trimethylsilyl methanetrifluoro sulfonate, bis trimethylsilyl sulfate, tris isopropylsilyl methanetrifluoro sulfonate, triethylsilyl phosphate, tris trimethylsilyl phosphate, ditertbutylsilyl bis, and combinations thereof.

13. The composition according to claim 11, wherein said silylating agent is tris trimethylsilyl phosphate.

14. The composition according to claim 11, having an onset of decomposition temperature of at least about 200° C.

15. Reaction products according to any one of claims 1–11.

16. A method of preparing a composition according to claim 1, said method comprising the step of:
    combining an α-cyanoacrylate component with an amount of a thermal resistance-conferring agent effective to confer enhanced thermal resistance to reaction products of the composition.

17. A method of using a composition according to claim 1, said method comprising the steps of:
    applying the composition to a surface of a substrate, and mating another substrate therewith.

18. A cyanoacrylate-containing composition, reaction products of which demonstrate enhanced thermal resistance properties, comprising:
    (a) an α-cyanoacrylate component, and
    (b) a thermal resistance-conferring component comprising the combination of alkylating agents and silylating agents.

* * * * *